United States Patent [19]

Slusser

[11] Patent Number: 5,438,026
[45] Date of Patent: Aug. 1, 1995

[54] MAGNESITE-CARBON REFRACTORIES AND SHAPES MADE THEREFROM WITH IMPROVED THERMAL STRESS TOLERANCE

[75] Inventor: William G. Slusser, West Mifflin, Pa.

[73] Assignee: Indresco Inc., Dallas, Tex.

[21] Appl. No.: 232,381

[22] Filed: Apr. 25, 1994

[51] Int. Cl.⁶ .............................................. C04B 35/52
[52] U.S. Cl. ..................................... 501/100; 501/101
[58] Field of Search ................................. 501/100, 101

[56] References Cited

U.S. PATENT DOCUMENTS

| | | | |
|---|---|---|---|
| 3,316,108 | 4/1967 | Blomberg | 501/120 |
| 3,531,307 | 9/1970 | Rubin et al. | 501/119 |
| 4,162,168 | 7/1979 | Smith et al. | 501/119 |
| 4,234,786 | 11/1980 | Borom et al. | 219/544 |
| 4,306,030 | 12/1981 | Watanabe et al. | 501/99 |
| 4,912,068 | 3/1990 | Michael et al. | 501/101 |
| 4,957,887 | 9/1990 | Michael et al. | 501/101 |
| 5,262,362 | 11/1993 | Sundell | 501/101 |
| 5,338,712 | 8/1994 | MacMillan et al. | 501/94 |

FOREIGN PATENT DOCUMENTS

| | | | |
|---|---|---|---|
| 0166362 | 10/1982 | Japan | 501/101 |
| 0190868 | 11/1983 | Japan | 501/100 |
| 0232961 | 12/1984 | Japan | 501/100 |

Primary Examiner—Mark L. Bell
Assistant Examiner—David Sample
Attorney, Agent, or Firm—John L. Sigalos

[57] ABSTRACT

A magnesite-carbon refractory mix for forming refractory shapes containing magnesite, graphite, and a fine particle size metallic additive consisting essentially of a magnesium-aluminum alloy co-milled with magnesite and refractory shapes and refractory linings made therefrom.

15 Claims, 2 Drawing Sheets

MAGNESITE-CARBON REFRACTORIES AND SHAPES MADE THEREFROM WITH IMPROVED THERMAL STRESS TOLERANCE

BACKGROUND OF THE INVENTION

The instant invention relates to magnesite-carbon refractory mixes for forming refractory shapes, particularly brick, utilizing a metallic additive.

Carbon-containing refractory brick have long been in use in metallurgical vessels where the lining is subject to slag attack and where high hot strength and high slag resistance of the refractories are desired and required. Improvements have been made in such brick in which carbonaceous material such as pitch, tar and the like which were used to form the bond of the magnesite-carbon brick have been replaced with flake or vein graphite.

While this has resulted in improvements, it was found that loss of carbon in the brick was a factor which limited service life. It was noted that the addition of metals such as aluminum, silicon, magnesium, and alloys thereof increased hot strength and oxidation resistance by forming carbides, lowering the permeability of the brick by spinel formation, and by consuming oxygen that would otherwise have oxidized carbon.

However, the addition of these metals has had in and of itself a number of well known undesirable effects, one of them being the troublesome problem of explosive dust cloud formation which can occur with the use of the metallic powders. In some instances, companies specify, for safety purposes that the metal powders have a maximum of 5% of −100 mesh content. Thus, it has been known to utilize coarse metal powders or metal alloys; that is, those having a particle size larger than 100 mesh. While eliminating the problem of explosion, this has resulted in refractory shapes such as brick that contain magnesium having undesirably high thermal expansion and static modulus of elasticity. Use of such brick in metallurgical vessels such as a Basic Oxygen Furnace (BOF) has resulted in excessive spalling and cracking of the brick caused by thermal stresses which arise when the constrained brick are heated to operating temperatures.

SUMMARY OF THE INVENTION

The instant invention overcomes the problems of prior art magnesium-containing MgO-C brick and provides refractory mixes which can be formed into refractory shapes without the risk of an explosion during processing while also having low thermal expansion, low static modulus of elasticity, and high 2000° F. modulus of rupture. The consequence of the positive improvement in all three of the aforementioned properties is an improved thermal stress tolerance for a magnesite carbon refractory.

Briefly stated, the present invention comprises a magnesite-carbon refractory mix for forming refractory shapes comprising magnesite, graphite and a fine particle size metallic additive consisting essentially of a magnesium-aluminum alloy co-milled with magnesite.

The invention also comprises the refractory shapes, particularly brick, formed from such mixes which have lower thermal expansion than conventional magnesium-containing MgO-C brick and refractory linings formed using such shapes, which during heat-up create less stress while also having the added ability to tolerate higher stress levels than a conventional magnesite-carbon lining.

DETAILED DESCRIPTION

Figure 1:
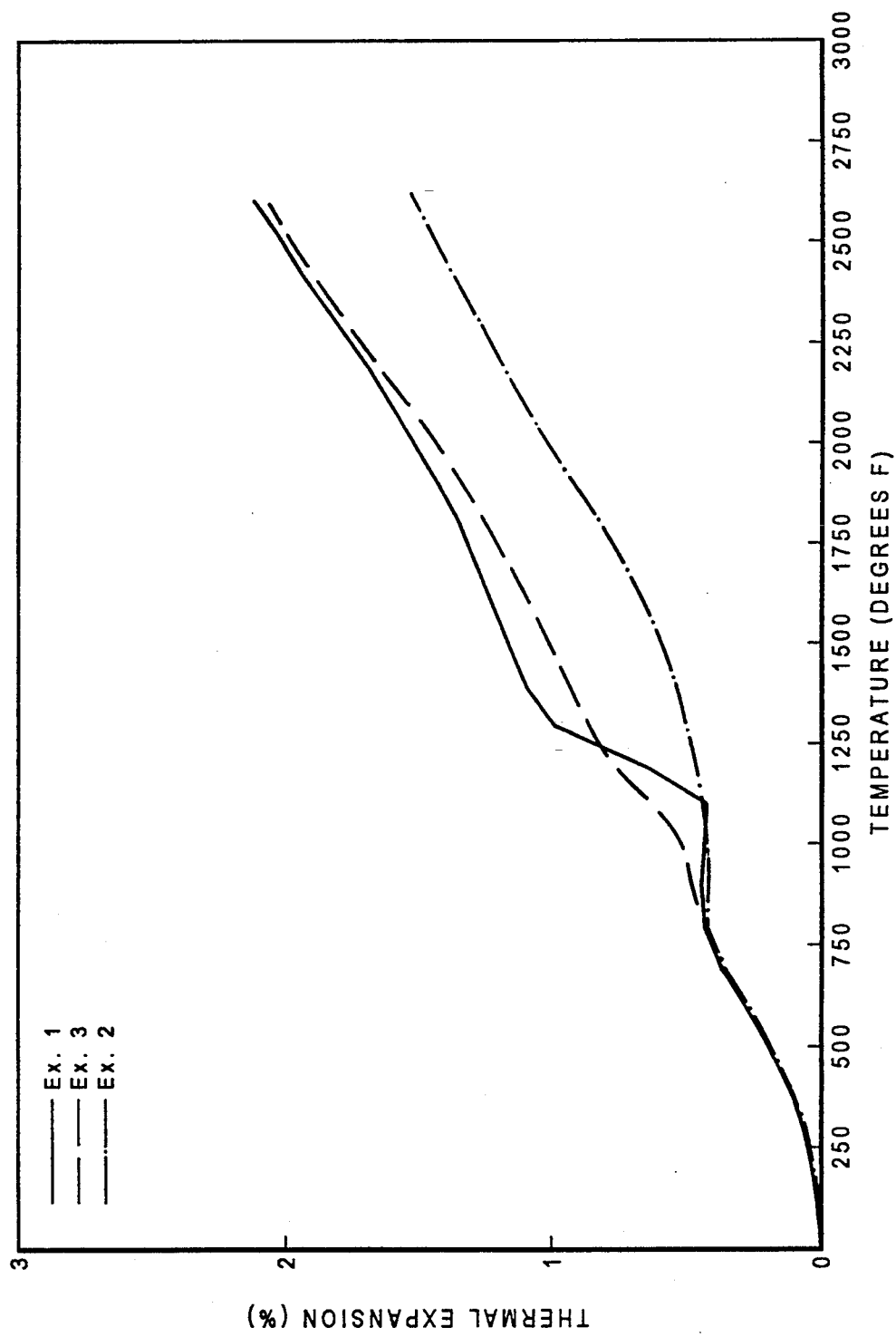
FIG. 1 is a graph showing the thermal expansion of the brick of Examples 1 to 3.

The term "magnesite-carbon brick" is used herein as generally defined in the metallurgical and refractory industries; namely, brick that contain graphite in combination with a magnesite such as deadburned magnesite and the like, with the brick containing in excess of about 5% by wt. carbon.

The magnesite used in the subject brick is most suitably deadburned or fused magnesite, preferably one containing at least 97 wt. % MgO, most preferably at least 98 wt. % MgO. Although lower levels of MgO content are still operative, the magnesite should have a purity of at least 90% MgO.

As to the graphite, it is preferably flake graphite, although vein graphite can also be utilized. It's sizing and purity are not critical in this invention, but should be that conventionally used in MgO-C brick making.

These two components are utilized in the usual proportions forming mixes to be made into brick, ordinarily about 70 to 95 wt. % magnesite and, correspondingly, 5 to 30 wt. % graphite. Magnesite, as is noted, is the major component of the mix with the only other essential component being the metallic additive of the instant invention.

Such metallic additive is preferably a magnesium-aluminum alloy co-milled with magnesite. It may be possible to use discrete additions of magnesium and aluminum metal co-milled with the magnesite to the fine size desired. For safety and reasons of economy, it is preferred to use a magnesium-aluminum alloy and preferably one that is a 50/50 admixture of the metals, although various ratios of magnesium to aluminum may be employed. It is envisioned that other metals or metal alloys, such as silicon and boron, or mixtures thereof, may be co-milled with magnesite to improve the thermal stress tolerance of the resultant refractory.

As to the magnesite co-milled therewith, it is preferred that the total additive comprise at least 60 wt. % of the magnesite with the balance being the alloy, although from 40 to 80 wt. % of magnesite can be utilized with the balance being the alloy. The same magnesites as discussed above can be used although it is preferred to use a magnesite containing at least 95 wt. % MgO. Of critical importance is the fact that the milling must be such to give a resultant particle size which imparts improved thermal stress tolerance to the refractory. The particle size of the co-milled powder is 100% −28 mesh with there being greater than 5% −100 mesh. Preferably, the co-milled metallic additive has at least about 80% −200 mesh and most preferably one in which the particle size of the metallic additive is at least about 50% −325 mesh. All mesh sizes discussed herein are Tyler mesh sizes. It has been found that the utilization thereof results in mixes which can be formed into brick having unusually low thermal expansion for magnesium-containing MgO-C brick.

As is conventional in making magnesite-carbon brick, it is necessary also to include in the mix a carbonaceous bonding agent, examples of which are novolak or resol resins. The amount added is ordinarily about 1.5 to 6% by wt. based on 100 wt. % of the mix.

Other than the fact that it is essential to co-mill the metals and the magnesite in forming the metallic additive, the method of forming the brick is not critical in that the components noted are simply thoroughly admixed, pressed into shape in the usual brick-making presses and then cured at the usual temperatures; namely, about 250° to 500° F. to form the cured but unburned brick which can then be used as linings in metallurgical vessels. When placed into metallurgical vessels as a lining, the bricks become exposed to the high temperatures in such furnaces and form carbon-bonded brick of high hot strength, improved slag resistance, and most importantly of lower thermal expansion.

The invention will be further described in connection with the following examples which are set forth for purposes of illustration only.

EXAMPLES 1 TO 3

Three different mixes were made whose formulations, in wt. %, are set forth in Table I below. Only the mix of Example 2 is in accord with the present invention. The co-milled metallic additive contains 3 parts by weight magnesite (~97 wt. % MgO) and 1 part by weight 50–50 Mg-Al alloy. Use of 12 wt. % of the alloy gives the mix a resultant metal content of 3 wt. %.

TABLE I

| Example No. | 1 | 2 | 3 |
|---|---|---|---|
| Magnesite (~97 wt. % MgO) | | | |
| −4 + 10 mesh | 29% | 29% | 29% |
| −10 + 28 mesh | 31 | 31 | 31 |
| −28 mesh | 13 | 11 | 13 |
| Fines | 7 | — | 7 |
| Graphite, −100 mesh, 99% purity | 17 | 17 | 17 |
| Aluminum Powder | 1.5 | — | — |
| Magnesium Powder | 1.5 | — | — |
| Co-Milled Metallic Additive | — | 12 | — |
| Mg—Al Alloy | — | — | 3 |
| Plus Additions: | | | |
| Phenolic Resins | | ← 3.7 → | |
| Calculated Screen Analysis | | | |
| −4 + 10 mesh | 30% | 30% | 30% |
| −19 + 28 mesh | 29 | 29 | 29 |
| −28 + 65 mesh | 8 | 6 | 9 |
| −65 mesh | 33 | 35 | 32 |
| −150 mesh | 22 | 23 | 21 |
| −325 mesh | 10 | 10 | 9 |

The screen analyses of the metal, Mg—Al alloy, co-milled metallic powders are as follows:

| Material: | Al Powder | Mg Powder | Mg—Al Alloy Powder | Co-Milled Metallic Additive (Magnesite and Mg—Al Alloy Powder) | |
|---|---|---|---|---|---|
| Screen Analysis % Held on 28 mesh | — | 1 | 1 | — | 1 | 1 |
| 35 | — | | | | T | |
| 48 | — | 49 | 22 | | T | 1 |
| 65 | — | 39 | 46 | | 3 | 4 |
| 100 | — | 7 | 95 | 24 | 92 | 5 |
| 150 | *T | 4 | 8 | T | 8 | 15 |
| 200 | 4 | — | 4 | — | 10 | 10 |
| 270 | 8 | — | — | — | 12 | |
| 325 | 4 | — | — | T | 6 | |
| Pass 325 | 84 | 100 | — | T | T | 52 | 80 |

*T = Trace

The mixes were formed into brick by conventional means. The brick were then tested to measure their physical properties. The processing conditions and physical properties are set forth in Table II below.

TABLE II

| Example No. | 1 | 2 | 3 |
|---|---|---|---|
| Raw Batch Weight, Pounds | | 26 | |
| Mixing Time, minutes: | | 3 | |
| Batch Temperature After Mixing, °F.: | 99 | 97 | 98 |
| Bulk Density at the Press, pcf | 180 | 179 | 180 |
| Total Linear Expansion from Mold Size After Curing at 350° F., %: | +0.6 | +0.6 | +0.6 |
| Bulk Density After Baking, pcf: | 178 | 177 | 178 |
| Data from Porosity (After Coking) | | | |
| Unimpregnated Bulk Density, pcf: | 175 | 174 | 173 |
| Apparent Porosity, %: | 9.3 | 10.1 | 10.0 |
| Apparent Specific Gravity: | 3.10 | 3.10 | 3.09 |
| Modulus of Rupture, psi At 2000° F.: | 2750 | 2250 | 2080 |
| Crushing Strength, psi At 2800° F.: | 4190 | 3740 | 4000 |
| Linear Thermal Expansion, % At 2600° F.: | +2.15 | +1.54 | +2.09 |
| Permanent Linear Change, % After Heating to 2600° F.: | +0.79 | +0.19 | +0.72 |

The brick of Example 2 had a significantly lower linear thermal expansion and permanent linear change as compared to the brick of Examples 1 and 3 (see FIG. 1).

FIG. 1 shows that brick of Example 2 did not show a rapid increase in expansion between 1000° to 1250° F. as did brick containing discrete or alloyed metallics without being co-milled with magnesite. The sharp rise in thermal expansion between 1000°–1250° F. is believed to be very detrimental to brick constrained in a furnace lining.

EXAMPLES 4 TO 11

A series of eight mixes having the formulations shown in Table III below were prepared and formed into brick as set forth in Examples 1 to 3, all proportions being in wt. %.

TABLE III

| Example No. | 4 | 5 | 6 | 7 | 8 | 9 | 10 | 11 |
|---|---|---|---|---|---|---|---|---|
| Magnesite (~98 wt. % MgO) | | | | | | | | |
| −4 + 10 mesh | 32% | 32% | 32% | 32% | 32% | 32% | 32% | 32% |
| −10 + 28 mesh | 31 | 31 | 31 | 31 | 31 | 31 | 31 | 31 |
| −28 mesh | 9 | 8 | 7.5 | 8 | 8 | 8 | 8 | 7.5 |
| Fines | 8 | 8 | 7.5 | — | — | 4.5 | 2 | — |
| Graphite −28 mesh | 17 | 17 | 17 | 17 | 17 | 17 | 17 | 17 |
| Aluminum Powder | 1.5 | 2 | 2.5 | — | — | — | — | — |
| Magnesium Powder | 1.5 | 2 | 2.5 | — | — | — | — | — |
| Co-Milled Metallic Additive* | | | | | | | | |
| A (75/25 Alloy) | — | — | — | 12 | — | — | — | — |
| B (75/25 Alloy) | — | — | — | — | 12 | — | — | — |
| C (60/40 Alloy) | — | — | — | — | — | 7.5 | 10 | 12.5 |
| Amount of Metal in Mix | 3 | 4 | 5 | 3 | 3 | 3 | 4 | 5 |
| Plus Additions: Phenolic | | | | ← 3.7% → | | | | |

TABLE III-continued

| Example No. | 4 | 5 | 6 | 7 | 8 | 9 | 10 | 11 |
|---|---|---|---|---|---|---|---|---|
| Resins | | | | | | | | |

*A = 25% 50-50 Mg/Al alloy and 75% magnesite +4 mesh
B = 25% 50-50 Mg/Al alloy and 75% magnesite briquettes
C = 40% 50-50 Mg/Al alloy and 60% magnesite briquettes The brick processing conditions and physical properties of the brick are set forth in Table IV below.

TABLE IV

| Example No. | 4 | 5 | 6 | 7 | 8 | 9 | 10 | 11 |
|---|---|---|---|---|---|---|---|---|
| Mixing Time, minutes: | | | | 4 minutes | | | | |
| Batch Temperature After Mixing, °F.: | 96 | 99 | 101 | 96 | 97 | 100 | 100 | 100 |
| Bulk Density at the Press, pcf: | 181 | 179 | 179 | 180 | 181 | 181 | 180 | 178 |
| Total Linear Expansion From Mold Size After Curing at 350° F., % | +0.6 | +0.6 | +0.6 | +0.3 | +0.6 | +0.6 | +0.6 | +0.6 |
| Bulk Density After Baking, pcf: | 180 | 178 | 178 | 179 | 178 | 178 | 178 | 176 |
| Data From Porosity (After Coking) | | | | | | | | |
| Unimpregnated Bulk Density, pcf: | 175 | 175 | 174 | 175 | 175 | 175 | 175 | 173 |
| Apparent Porosity, %: | 9.2 | 9.4 | 9.3 | 9.4 | 9.4 | 9.5 | 10.1 | 10.8 |
| Apparent Specific Gravity: | 3.09 | 3.09 | 3.08 | 3.09 | 3.10 | 3.10 | 3.11 | 3.11 |
| Modulus of Rupture, psi At 2000° F., Reducing Conditions | 2660 | 3170 | 3150 | 2000 | 2580 | 2130 | 2920 | 3300 |
| Crushing Strength, psi At 2800° F., Reducing Conditions | 3770 | 4100 | 3910 | 3280 | 3990 | 3990 | 3890 | 3490 |
| Linear Thermal Expansion At 2600° F., %: | +2.01 | — | +2.31 | — | — | +1.58 | — | +1.83 |
| Permanent Linear Change After Heating to 2600° F., %: | +0.55 | — | +0.81 | — | — | +0.21 | — | +0.24 |
| Stress-Strain Tests | | | | | | | | |
| Static Modulus of Elasticity ($\times 10^6$ psi) at 2000° F.: | 1.04 | — | 1.25 | — | — | 0.99 | — | 1.12 |
| Crushing Strength, psi at 2000° F.: | 3670 | — | 4320 | — | — | 4710 | — | 4810 |
| Thermal Stress Ratio: | 0.24 | — | 0.22 | — | — | 0.43 | — | 0.34 |

Comparing the brick of Examples 4, 5 and 6 to those of Examples 7 to 11 again, the brick made utilizing the co-milled metallic additive had lower linear thermal expansion, lower permanent linear change, lower static modulus of elasticity (MOE)at 2000° F., higher crushing strength at 2000° F., and a higher thermal stress ratio* which is desirable. The thermal stress ratio is determined by the following formula:

$$*\text{Thermal Stress Ratio} = \frac{\text{Crushing Strength}}{\text{MOE} \times \text{Thermal Expansion}}$$

Two mixes based upon use of higher purity raw materials were made and their formulations in wt. % are set forth in Table V below. Example 12 contains aluminum metal plus a coarse metal alloy. Example 13 also contains aluminum powder and co-milled powder used in the prior examples. This imparts into the mix of Example 13 2% Mg/Al metal, so it is a direct comparison to the mix shown in Example 12. The mixes were formed into brick as previously described and the brick were tested as set forth in Table VI below.

Figure 2:
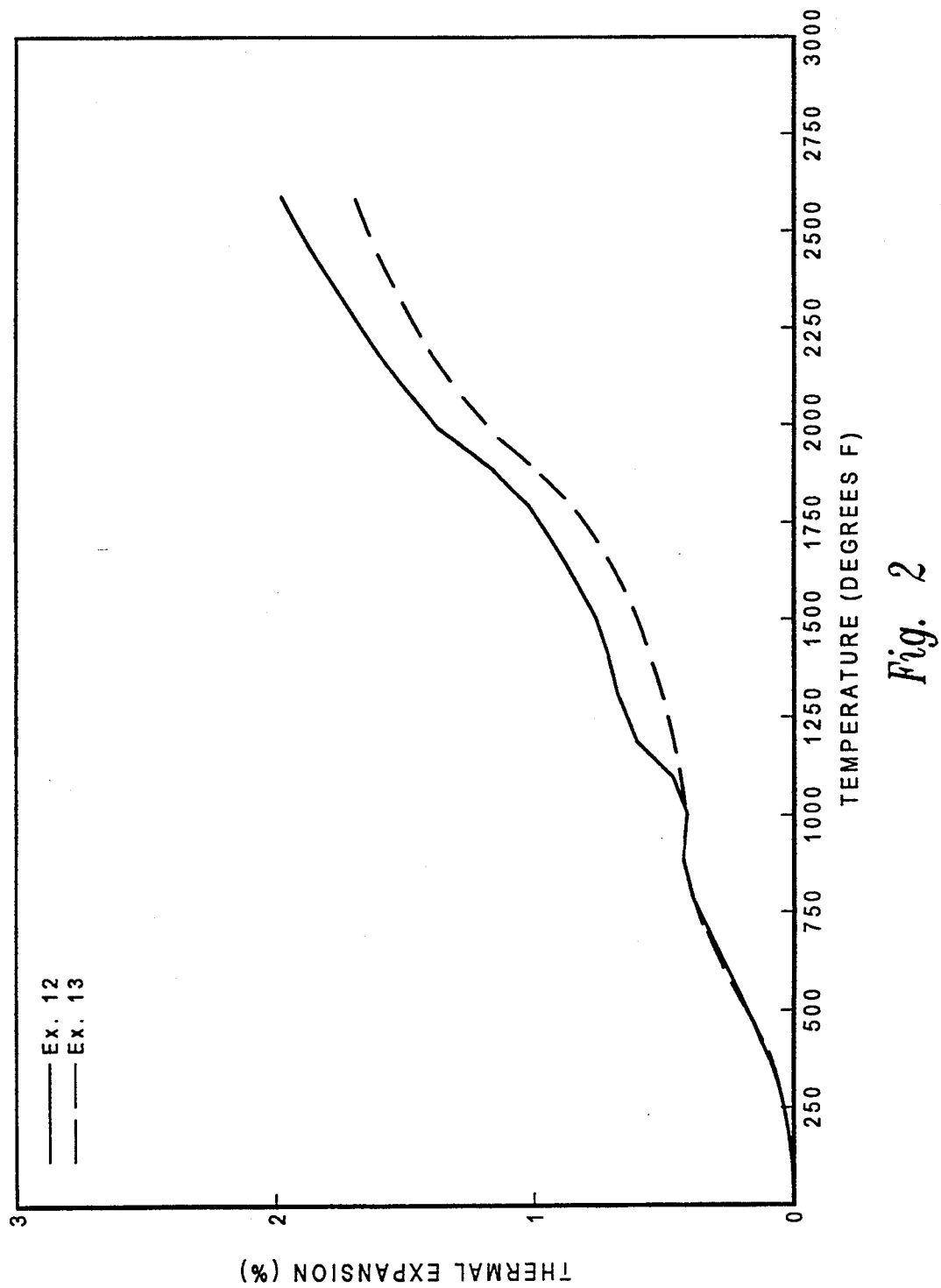
FIG. 2 is a graph showing the thermal expansion of the brick of Examples 12 and 13

A review of this data indicates the same trend as seen in the prior examples. The mix with the co-milled alloy and magnesite had lower apparent porosity, higher crushing strength at 2000° F. and lower thermal expansion (see FIG. 2), than a similar mix with the same metal content, but without the co-milled magnesite. The thermal stress ratio of Example 13 showed a 13% improvement over the thermal stress ratio of Example 12.

TABLE V

| Example No. | 12 | 13 |
|---|---|---|
| Deadburned Magnesite (99% Purity) | | |
| −4 + 10 mesh | 34.0% | 34.0% |
| −10 + 28 mesh | 33.0 | 33.0 |
| Fines | 16.5 | 10.5 |
| Flake Graphite | | |
| −100 mesh, 99% Purity | 12.5 | 12.5 |
| Co-milled 50 Mg—50 Al Alloy + MgO, −28 mesh | — | 8.0 |
| Aluminum Powder, −65 mesh | 2.0 | 2.0 |
| 50 Mg—50 Al Alloy, −10 + 65 mesh | 2.0 | — |
| Plus Additions: Phenolic Resins | 3.7 | 3.7 |
| Calculated Screen Analysis | | |
| % Held on 10 mesh | 30% | 30% |
| −10 + 28 mesh | 31 | 30 |
| −28 + 65 mesh | 11 | 13 |
| −65 mesh | 28 | 27 |
| −150 mesh | 23 | 22 |
| −325 mesh | 15 | 14 |

TABLE VI

| Example No. | 12 | 13 |
|---|---|---|
| Mix Details: | | |
| Alloy | Coarse 50Mg—50Al | Co-milled 50Mg—50Al and MgO |
| Mixing Time, minutes: | 4 | 4 |
| Batch Temperature after Mixing, °F.: | 92 | 94 |

TABLE VI-continued

| Example No. | 12 | 13 |
| --- | --- | --- |
| Bulk Density at the Press, pcf: | 184 | 184 |
| Total Linear Expansion from Mold Size After Curing at 350° F., %: | +0.4 | +0.4 |
| Bulk Density after Baking, pcf | 181 | 180 |
| Data from Porosity (After Coking) | | |
| Unimpregnated Bulk Density, pcf: | 175 | 176 |
| Apparent Porosity, %: | 12.1 | 11.1 |
| Apparent Specific Gravity | 3.18 | 3.16 |
| Stress-Strain Tests | | |
| Static Modulus of Elasticity ($\times 10^6$ psi): At 2000° F.: | 1.09 | 1.22 |
| Crushing Strength, psi At 2000° F.: | 4850 | 5160 |
| Thermal Stress Ratio | 0.32 | 0.36 |
| Modulus of Rupture At 2000° F.: | 1880 | 1900 |
| Crushing Strength, psi At 2800° F.: | 4360 | 4090 |
| Thermal Expansion % Linear change at 2600° F.: | 2.00 | 1.71 |

While the invention has been described in connection with a preferred embodiment, it is not intended to limit the scope of the invention to the particular form set forth, but on the contrary, it is intended to cover such alternatives, modifications and equivalents as may be included within the spirit and scope of the invention as defined by the appended claims.

What is claimed is:

1. A magnesite-carbon refractory mix for forming refractory shapes comprising magnesite, graphite, and a fine particle size metallic additive consisting essentially of a magnesium-aluminum alloy co-milled with magnesite.

2. The refractory mix of claim 1 wherein said metallic additive comprises at least 60 wt. % magnesite and the balance a 50/50 magnesium-aluminum alloy.

3. The refractory mix of claim 2 wherein the particle size of said metallic additive is at least about −28 mesh with greater than 5% −100 mesh.

4. The refractory mix of claim 3 wherein said particle size is at least about 50% −325 mesh.

5. The refractory mix of claim 4 wherein the magnesite co-milled with said alloy contains at least about 95 wt. % MgO.

6. A magnesite-carbon refractory shape formed from a refractory mix comprising magnesite, graphite, and a fine particle size metallic additive consisting essentially of a magnesium-aluminum alloy co-milled with magnesite.

7. The refractory shape of claim 6 in the form of a cured brick and wherein said metallic additive comprises at least 60 wt. % magnesite and the balance a 50/50 magnesium-aluminum alloy.

8. The brick of claim 7 wherein the particle size of said metallic additive is at least about −28 mesh with greater than 5% −100 mesh.

9. The brick of claim 8 wherein said particle size is at least about 50% −325 mesh.

10. The brick of claim 9 wherein the magnesite co-milled with said alloy contains at least about 95 wt. % MgO.

11. A refractory lining for a metallurgical vessel having improved thermal stress tolerance comprising a plurality of cured refractory shapes, each of said shapes formed from a mix comprising magnesite, graphite, and a fine particle size metallic additive consisting essentially of a magnesium-aluminum alloy co-milled with magnesite.

12. The lining of claim 11 in which the shapes are brick and wherein said metallic additive comprises at least 60 wt. % magnesite and the balance a 50/50 magnesium-aluminum alloy.

13. The lining of claim 12 wherein the particle size of said metallic additive is at least about −28 mesh with greater than 5% −100 mesh.

14. The lining of claim 13 wherein said particle size is at least about 50% −325 mesh.

15. The lining of claim 14 wherein the magnesite co-milled with said alloy contains at least about 95 wt. % MgO.

* * * * *